Oct. 6, 1959  R. SPRATT ET AL  2,907,384
PROTECTIVE COVER FOR VEHICLE WINDSHIELDS AND WINDOWS
Filed Aug. 16, 1957
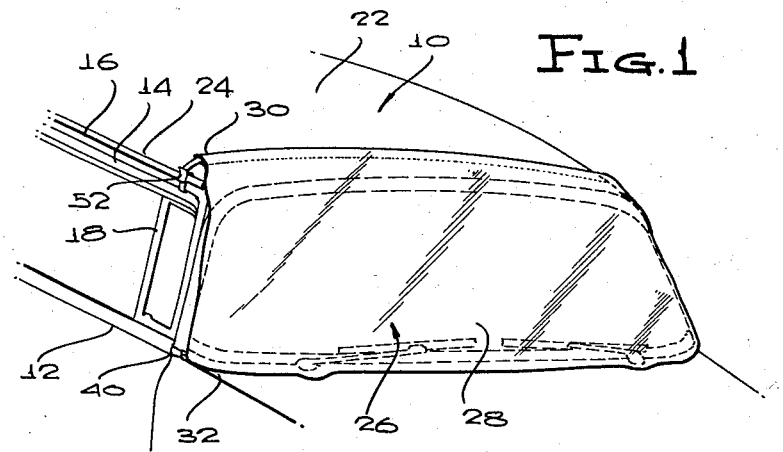
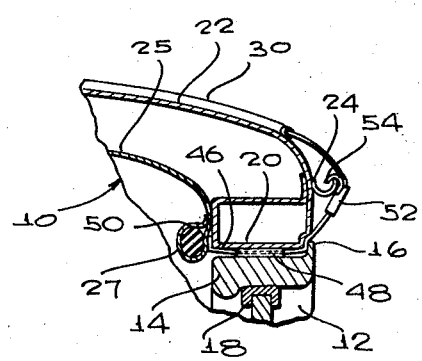
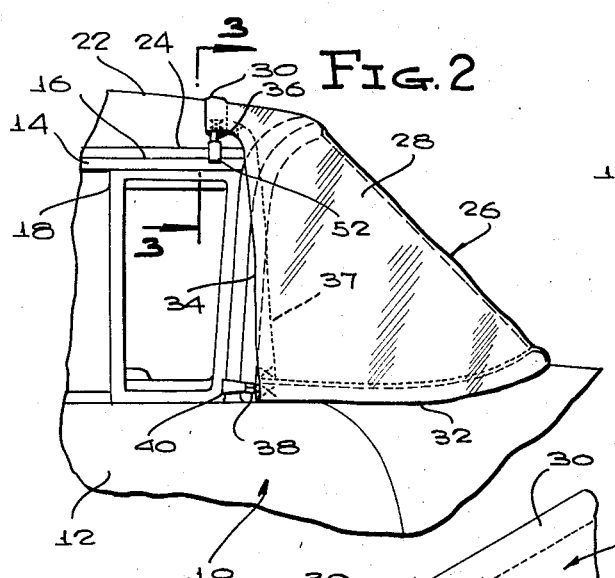
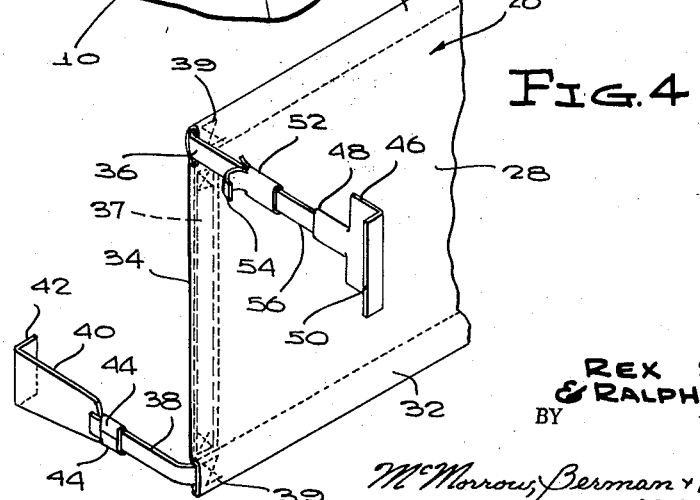
INVENTORS
REX SPRATT
& RALPH SPRATT
BY
McMorrow, Berman & Davidson
ATTORNEYS United States Patent Office 2,907,384
Patented Oct. 6, 1959

2,907,384
PROTECTIVE COVER FOR VEHICLE WINDSHIELDS AND WINDOWS

Rex Spratt and Ralph Spratt, St. Petersburg, Fla.

Application August 16, 1957, Serial No. 678,602

4 Claims. (Cl. 160—368)

This invention relates to a protector, designed mainly for overlying the windshield of an automobile, but also adapted for protectively overlying the rear window or even the side windows of a vehicle.

The main object of the present invention is to provide an improved protector of the type described, for the purpose of covering the windshield to protect the same from snow, sleet, rain, ice, etc., when the vehicle is not in use. In this way, when the vehicle is to be used, the protector can be swiftly removed, thereby exposing a clean, dry windshield.

An object of the invention is to provide a protector as stated which will be characterized by the ease and speed with which it can be applied or removed.

Another object is to include novel clip means on the protector, designed particularly for engaging portions of conventional automobiles, without damaging said portions of the vehicles.

Another object is to form the clip means in a manner such that they will cooperate with resiliently elongatable, flexible elements of the protector, in tensioning the protector across the windshield and securely holding the same in place.

Another object is to provide, in a protector of the character described, means that will permit the same to be applied to any of a large number of automobiles, without requiring modification or redesign of the device to fit particular vehicles.

Another object is to provide a protector of the character described that will be capable of manufacture at a very low cost, while still providing a high degree of protection from the elements and while still being rugged and capable of use over a long period of time.

Yet another object is to embody in the protector flexible, elastic elements extending along the top, bottom, and side edges of the protector, said elements freely sliding in the associated edge portions of the body of the protector, while being secured to the protector at the corners, thereby to cause the protector to be tensioned responsive to corresponding tensioning of the elastic elements when the device is in use.

Still another object is to provide novel clip means designed to effect a cooperating action between the drip strip of a vehicle body and the top of the vehicle door frame, to assure a particularly effective connection of the device, at the upper corners thereof, to the vehicle.

Other objects will appear from the following description, the claims appended thereto, and from the annexed drawing, in which like reference characters designate like parts throughout the several views, and wherein:

Figure 1 is a perspective view of a protector according to the invention, applied to a vehicle only a fragmentary part of which is shown;

Figure 2 is a fragmentary side elevational view of the vehicle with the protector applied thereto;

Figure 3 is an enlarged, detail sectional view on line 3—3 of Figure 2; and

Figure 4 is an enlarged, fragmentary perspective view of the protector per se.

Referring to the drawings in detail, a conventional vehicle 10 is shown, said vehicle having the door 12, provided with the usual top rail 14 that has a low, upwardly projecting lip 16. A visor frame 18 is shown, and at 20 there has been designated the header of the door frame, said header constituting a part of the vehicle roof structure 22, with said roof structure further including, exteriorly of the same, an upwardly opening drip strip 24. Within the vehicle, there is provided roof upholstery 25, having the usual heading 27 that extends along the inner surface of the door frame header 20.

All this is conventional construction and does not constitute part of the present invention.

The protector 26 constituting the present invention is formed with a rectangular, flexible, waterproof body such as thin sheet plastic material, said body being designated at 28 and being formed with top and bottom hems 30, 32 extending from side to side of the body, said hems communicating at their opposite ends with side hems 34.

Extending within the top and bottom hems are elongated, elastic strips 36, 38. In their contracted condition, said strips are of a length less than the width of the body, so that in effect said strips will tend to contract or ruffle the body when the device is not in use, thereby permitting the device to assume a compact shape that permits its storage in a small space, as for example, in the glove compartment of a vehicle.

The strips 36, 38 are freely slidable in the hems 30, 32, except at the ends of the hems, where the strips are stitched directly to the material of the body by means of stitching 39. Therefore, when the strips are stretched, the body will be pulled taut, thereby to intimately contact the roof surface to prevent snow or rain from seeping downwardly between the room surface and the top hem, onto the windshield of the vehicle.

The bottom hem is also stretched taut, and preferably is extended under the windshield wipers of the vehicle as clearly shown in Figure 1.

The windshield is thus very well protected.

In the hem 34 there are disposed elastic strips 37, and these are also in their contracted condition, adapted to facilitate folding and storage of the device in a small area. When the side strips 37 are stretched, they tension the body at the sides thereof in a vertical direction, to provide a tight engagement of the side of the body against the vehicle at opposite ends of the windshield.

Thus, the flexible body is stretched taut in both horizontal and vertical directions when the device is applied to provide, in effect, a peripheral seal extending fully about the windshield.

The ends of the strip 38 project beyond the lower corners of the body, and elongated clips 40, formed each from a single length of flat sheet metal material increasing progressively in width in a direction toward its outer end, are secured to the strip ends. At their outer ends, the clips 40 have laterally inwardly extending lips 42 engaging in back of the front corner posts of the vehicle in a typical working arrangement as shown in Figure 2. In actuality the clips 42 can be engaged with any suitable, adjacent structural part of the vehicle, since they will be held in engagement with said part by the pull of the resiliently stretched lower strip 38.

At their inner ends, the clips 40 include ears 44 which are crimped about the strip 38 to connect the clips to the ends of the strip.

The strip 36 is provided with the clips 46, also of rightangular formation and formed from wide pieces of sheet metal material, the inner ends of the clips being bent about the strip ends and being crimped in place to provide attaching sleeves 48 of flattened formation. At their outer ends, the clips 46 have angular extensions 50.

The clips 46 are engaged under the door header, with the bodies of the clips being disposed between the top rail of the door 14 and the under-surface of the header 20. The angular extensions 50 extend upwardly along the inner side wall of the header, between the beading 27 and the side wall of the header (see Figure 3). The flattened sleeve 48 is disposed between the door and the header, and the material of the strip is extended outwardly, with the strip having, adjacent the clip, a flattened sleeve 52 crimped into engagement with the strip and integrally formed at one end with a reversely bent hook 54 engageable over the drip strip or flange 24 of the vehicle.

Thus it can be seen that the short portion 56 of the strip 36, disposed between sleeves 48, 52 can be stretched slightly, to permit hook 54 to engage over the drip flange while the hook part or angular extension 50 engages against the inner wall of the header. This quickly and easily connects the strip end to the side of the vehicle body, with the remaining portion of the strip 36 being tensioned across the vehicle roof. A swift and easy connection of the device of the vehicle is thus assured, which connection can be easily removed whenever desired.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A protector for the windshield of a vehicle having, beyond opposite sides of the windshield, door headers, drip flanges above the headers, and doors below the headers, comprising: a body of flexible sheet material proportioned to overlie a windshield; upper and lower strips on the body the ends of which project outwardly beyond opposite sides of the body; clip means on each strip end for engaging said vehicle, the clip means of the upper strip comprising a first clip having perpendicularly related inner and outer legs both of which are thin and generally straight in side elevation, for fitting of the inner leg between a door header and the top of a door when the door is closed, with the outer leg engaged snugly against the inner side surface of the header, and a second clip spaced along the strip from the first clip and formed as a small hook opening toward the first clip for engagement over the drip flange, the strip having a short portion connected between the first and second clips and resiliently stretchable in the direction of its length for tensioning of said portion to bias the first and second clips toward each other into binding engagement with the header and drip flange respectively.

2. A protector as in claim 1 wherein at least the upper strip is resiliently longitudinally stretchable between the clip means thereof for tensioning across the vehicle when its clip means is engaged with the vehicle.

3. A protector as in claim 1 wherein the first clip comprises a length of wide, sheet material one extremity of which is a sleeve connected fixedly to the strip portion and flattened sufficiently to fit between the header and the closed door.

4. A protector as in claim 3 wherein the second clip also comprises a length of wide, sheet material one extremity of which is a flattened sleeve fixedly connected to said strip portion and the other extremity of which is reversely curved toward the first extremity of the second clip to define said hook.

References Cited in the file of this patent

UNITED STATES PATENTS

| | | |
|---|---|---|
| 736,242 | Gable | Aug. 11, 1903 |
| 1,508,643 | Brokaw | Sept. 16, 1924 |
| 1,732,447 | Crane | Oct. 22, 1929 |
| 2,437,845 | Wyeth | Mar. 16, 1948 |
| 2,610,085 | Zeeb | Sept. 9, 1952 |
| 2,614,630 | Moszelt | Oct. 21, 1952 |
| 2,821,248 | Irvine | Jan. 28, 1958 |